United States Patent
Gopalkrishna et al.

(10) Patent No.: US 12,511,876 B2
(45) Date of Patent: Dec. 30, 2025

(54) SINGLE STREAM MULTI-LEVEL ALIGNMENT FOR VISION-LANGUAGE PRETRAINING

(71) Applicant: NEC Laboratories America, Inc., Princeton, NJ (US)

(72) Inventors: Vijay Kumar Baikampady Gopalkrishna, Santa Clara, CA (US); Xiang Yu, Mountain View, CA (US); Samuel Schulter, Long Island City, NY (US)

(73) Assignee: NEC Corporation, Tokyo (JP)

( * ) Notice: Subject to any disclaimer, the term of this patent is extended or adjusted under 35 U.S.C. 154(b) by 389 days.

(21) Appl. No.: 18/175,906

(22) Filed: Feb. 28, 2023

(65) Prior Publication Data

US 2023/0281963 A1    Sep. 7, 2023

Related U.S. Application Data

(60) Provisional application No. 63/317,499, filed on Mar. 7, 2022.

(51) Int. Cl.
*G06F 40/10*    (2020.01)
*G06F 40/205*    (2020.01)
(Continued)

(52) U.S. Cl.
CPC ........ *G06V 10/7715* (2022.01); *G06F 40/205* (2020.01); *G06F 40/284* (2020.01);
(Continued)

(58) Field of Classification Search
USPC ......... 128/922–925; 382/151–159, 168–225; 704/1–275; 706/1–62, 900–903
See application file for complete search history.

(56) References Cited

U.S. PATENT DOCUMENTS

2021/0271707 A1*  9/2021  Lin ..................... G06F 40/216
2021/0294945 A1*  9/2021  Müller .................. G06F 17/10
(Continued)

OTHER PUBLICATIONS

Xiaosong Wang et al., 'Self-supervised Image-text Pre-training With Mixed Data In Chest X-rays', arXiv:2103.16022 <https://arxiv.org/pdf/2103.16022v1.pdf> (pp. 2-5; figures 2-3).
(Continued)

*Primary Examiner* — Marcellus J Augustin
(74) *Attorney, Agent, or Firm* — Vincent Duffy; Joseph Kolodka (57) ABSTRACT

A method is provided for pretraining vision and language models that includes receiving image-text pairs, each including an image and a text describing the image. The method encodes an image into a set of feature vectors corresponding to input image patches and a CLS token which represents a global image feature. The method parses, by a text tokenizer, the text into a set of feature vectors as tokens for each word in the text. The method encodes the CLS token from the NN based visual encoder and the tokens from the text tokenizer into a set of features by a NN based text and multimodal encoder that shares weights for encoding both the CLS token and the tokens. The method accumulates the weights from multiple iterations as an exponential moving average of the weights during the pretraining until a predetermined error threshold is reduced to be under a threshold amount.

20 Claims, 6 Drawing Sheets

(51) Int. Cl.
    *G06F 40/284* (2020.01)
    *G06F 40/30* (2020.01)
    *G06V 10/10* (2022.01)
    *G06V 10/764* (2022.01)
    *G06V 10/77* (2022.01)
    *G06V 10/774* (2022.01)
    *G06V 10/776* (2022.01)
    *G06V 10/80* (2022.01)
    *G06V 10/82* (2022.01)
    *G06V 20/58* (2022.01)
    *G06V 20/70* (2022.01)
(52) U.S. Cl.
    CPC ............ *G06F 40/30* (2020.01); *G06V 10/774* (2022.01); *G06V 10/776* (2022.01); *G06V 10/806* (2022.01); *G06V 10/82* (2022.01)

(56) References Cited

U.S. PATENT DOCUMENTS

| | | | | |
|---|---|---|---|---|
| 2022/0172080 | A1* | 6/2022 | Chaudhury | G06N 3/08 |
| 2023/0135659 | A1* | 5/2023 | Wu | G06N 3/044 |
| | | | | 706/21 |
| 2023/0154188 | A1* | 5/2023 | Li | G06V 10/776 |
| | | | | 382/159 |
| 2023/0162490 | A1* | 5/2023 | Zhang | G06F 40/166 |
| | | | | 382/159 |
| 2023/0237772 | A1* | 7/2023 | Li | G06V 10/803 |
| | | | | 382/176 |
| 2023/0237773 | A1* | 7/2023 | Li | G06F 40/126 |
| | | | | 382/155 |
| 2024/0371082 | A1* | 11/2024 | Goyal | C10G 11/02 |

OTHER PUBLICATIONS

Youwei Liang et al., 'Not All Patches Are What You Need: Expediting Vision Transformers Via Token Reorganizations', arXiv:2202.07800v1, Feb. 2022 [retrieved on May 26, 2023]. Retrieved from <https://arxiv.org/pdf/2202.07800v1.pdf> (pp. 3-4, 7).

Jing Yu et al., 'Learning cross-modal correlations by exploring inter-word semantics and stacked coattention', Pattern Recognition Letters, vol. 130, Feb. 2020 (pp. 193, 197; and figure 1).

Zaid Khan et al., 'Single-Stream Multi-Level Alignment for Vision-Language Pretraining', arXiv: 2203.14395v3, Jul. 2022 [retrieved on May 26, 2023]. Retrieved from <https://arxiv.org/pdf/2203.14395v3.pdf> (whole document).

Bao, H., Dong, L., & Wei, F. (Jun. 15, 2021). Beit: Bert pre-training of image transformers. arXiv preprint arXiv:2106.08254.

Chen, Y. C., Li, L., Yu, L., El Kholy, A., Ahmed, F., Gan, Z., . . . & Liu, J. (Aug. 23, 2020). Uniter: Universal image-text representation learning. In European conference on computer vision (pp. 104-120). Springer, Cham.

Cho, J., Lei, J., Tan, H., & Bansal, M. (Jul. 1, 2021). Unifying vision-and-language tasks via text generation. In International Conference on Machine Learning (pp. 1931-1942). PMLR.

Cubuk, E. D., Zoph, B., Shlens, J., & Le, Q. V. (Jun. 13, 2020). Randaugment: Practical automated data augmentation with a reduced search space. In Proceedings of the IEEE/CVF conference on computer vision and pattern recognition workshops (pp. 702-703).

Devlin, J., Chang, M. W., Lee, K., & Toutanova, K. (Oct. 11, 2018). Bert: Pre-training of deep bidirectional transformers for language understanding. arXiv preprint arXiv:1810.04805.

Dosovitskiy, A., Beyer, L., Kolesnikov, A., Weissenborn, D., Zhai, X., Unterthiner, T., . . . & Houlsby, N. (Oct. 22, 2020). An image is worth 16×16 words: Transformers for image recognition at scale. arXiv preprint arXiv:2010.11929.

Gan, Z., Chen, Y. C., Li, L., Zhu, C., Cheng, Y., & Liu, J. (Dec. 6, 2020). Large-scale adversarial training for vision-and-language representation learning. Advances in Neural Information Processing Systems, 33, 6616-6628.

Goyal, Y., Khot, T., Summers-Stay, D., Batra, D., & Parikh, D. (Jul. 22, 2017). Making the v in vqa matter: Elevating the role of image understanding in visual question answering. In Proceedings of the IEEE conference on computer vision and pattern recognition (pp. 6904-6913).

He, K., Fan, H., Wu, Y., Xie, S., & Girshick, R. (Jun. 14, 2020). Momentum contrast for unsupervised visual representation learning. In Proceedings of the IEEE/CVF conference on computer vision and pattern recognition (pp. 9729-9738).

Hinton, G., Vinyals, O., & Dean, J. (Mar. 9, 2015). Distilling the knowledge in a neural network. arXiv preprint arXiv:1503.02531, 2(7).

Jia, C., Yang, Y., Xia, Y., Chen, Y. T., Parekh, Z., Pham, H., . . . & Duerig, T. (Jul. 1, 2021). Scaling up visual and vision-language representation learning with noisy text supervision. In International Conference on Machine Learning (pp. 4904-4916). PMLR.

Karpathy, A., & Fei-Fei, L. (Jun. 7, 2015). Deep visual-semantic alignments for generating image descriptions. In Proceedings of the IEEE conference on computer vision and pattern recognition (pp. 3128-3137).

Kim, J. H., Jun, J., & Zhang, B. T. (Dec. 3, 2018). Bilinear attention networks. Advances in neural information processing systems, 31.

Kim, W., Son, B., & Kim, I. (Jul. 1, 2021). Vilt: Vision-and-language transformer without convolution or region supervision. In International Conference on Machine Learning (pp. 5583-5594). PMLR.

Krishna, R., Zhu, Y., Groth, O., Johnson, J., Hata, K., Kravitz, J., . . . & Fei-Fei, L. (May 1, 2017). Visual genome: Connecting language and vision using crowdsourced dense image annotations. International journal of computer vision, 123(1), 32-73.

Li, J., Selvaraju, R., Gotmare, A., Joty, S., Xiong, C., & Hoi, S. C. H. (Dec. 6, 2021). Align before fuse: Vision and language representation learning with momentum distillation. Advances in neural information processing systems, 34, 9694-9705.

Li, L. H., Yatskar, M., Yin, D., Hsieh, C. J., & Chang, K. W. (Aug. 9, 2019). Visualbert: A simple and performant baseline for vision and language. arXiv preprint arXiv:1908.03557.

Li, X., Yin, X., Li, C., Zhang, P., Hu, X., Zhang, L., . . . & Gao, J. (Aug. 23, 2020). Oscar: Object-semantics aligned pre-training for vision-language tasks. In European Conference on Computer Vision (pp. 121-137). Springer, Cham.

Lin, T. Y., Maire, M., Belongie, S., Hays, J., Perona, P., Ramanan, D., . . . & Zitnick, C. L. (Sep. 6, 2014). Microsoft coco: Common objects in context. In European conference on computer vision (pp. 740-755). Springer, Cham.

Liu, X., Li, L., Wang, S., Zha, Z. J., Meng, D., & Huang, Q. (Jun. 15, 2019). Adaptive reconstruction network for weakly supervised referring expression grounding. In Proceedings of the IEEE/CVF International Conference on Computer Vision (pp. 2611-2620).

Loshchilov, I., & Hutter, F. (Nov. 14, 2017). Decoupled weight decay regularization. arXiv preprint arXiv:1711.05101.

Lu, J., Batra, D., Parikh, D., & Lee, S. (Dec. 8, 2019). Vilbert: Pretraining task-agnostic visiolinguistic representations for vision-and-language tasks. Advances in neural information processing systems, 32.

Lu, J., Goswami, V., Rohrbach, M., Parikh, D., & Lee, S. (Jun. 13, 2020). 12-in-1: Multi-task vision and language representation learning. In Proceedings of the IEEE/CVF Conference on Computer Vision and Pattern Recognition (pp. 10437-10446).

Van den Oord, A., Li, Y., & Vinyals, O. (Jan. 22, 2018). Representation learning with contrastive predictive coding. CoRR. arXiv preprint arXiv:1807.03748.

Van Den Oord, A., & Vinyals, O. (2017, Dec. 4, 2017). Neural discrete representation learning. Advances in neural Information processing systems, 30.

Ordonez, V., Kulkarni, G., & Berg, T. (Dec. 12, 2011). Im2text: Describing images using 1 million captioned photographs. Advances in neural information processing systems, 24.

Plummer, B. A., Wang, L., Cervantes, C. M., Caicedo, J. C., Hockenmaier, J., & Lazebnik, S. (Dec. 11, 2015). Flickr30k entities: Collecting region-to-phrase correspondences for richer image-to-sentence models. In Proceedings of the IEEE international conference on computer vision (pp. 2641-2649).

(56) References Cited

OTHER PUBLICATIONS

Radford, A., Kim, J. W., Hallacy, C., Ramesh, A., Goh, G., Agarwal, S., . . . & Sutskever, I. (Jul. 1, 2021). Learning transferable visual models from natural language supervision. In International Conference on Machine Learning (pp. 8748-8763). PMLR.

Sharma, P., Ding, N., Goodman, S., & Soricut, R. (Jul. 15, 2018). Conceptual captions: A cleaned, hypernymed, Image alt-text dataset for automatic image captioning. In Proceedings of the 56th Annual Meeting of the Association for Computational Linguistics (vol. 1: Long Papers) (pp. 2556-2565).

Su, W., Zhu, X., Cao, Y., Li, B., Lu, L., Wei, F., & Dai, J. (Aug. 22, 2019). Vl-bert: Pre-training of generic visual-inguistic representations. arXiv preprint arXiv:1908.08530.

Tan, H., & Bansal, M. (Aug. 20, 2019). Lxmert: Learning cross-modality encoder representations from transformers. arXiv preprint arXiv:1908.07490.

Vaswani, A., Shazeer, N., Parmar, N., Uszkoreit, J., Jones, L., Gomez, A. N., . . . & Polosukhin, I. (Dec. 4, 2017). Attention is all you need. Advances in neural information processing systems, 30.

Xie, N., Lai, F., Doran, D., & Kadav, A. (Jan. 20, 2019). Visual entailment: A novel task for fine-grained image understanding. arXiv preprint arXiv:1901.06706.

Yu, L., Poirson, P., Yang, S., Berg, A. C., & Berg, T. L. (Oct. 8, 2016). Modeling context in referring expressions. In European Conference on Computer Vision (pp. 69-85). Springer, Cham.

Zhang, Z., Zhao, Z., Lin, Z., & He, X. (Dec. 6, 2020). Counterfactual contrastive learning for weakly-supervised vision-language grounding. Advances in Neural Information Processing Systems, 33, 18123-18134.

\* cited by examiner

SINGLE STREAM MULTI-LEVEL ALIGNMENT FOR VISION-LANGUAGE PRETRAINING

RELATED APPLICATION INFORMATION

This application claims priority to U.S. Provisional Patent Application No. 63/317,499, filed on Mar. 7, 2022, incorporated herein by reference in its entirety.

BACKGROUND

Technical Field

The present invention relates to vision-language and more particularly to single stream multi-level alignment for vision-language pretraining.

Description of the Related Art

Recent progress in Vision-Language (VL) pre-training has shown the importance of aligning the visual and text modalities for many VL downstream tasks.

Many real-world applications such as image captioning, image-to-text retrieval, text-to-image retrieval, visual question answering, and so forth, require good alignment between visual and text modalities. Vision-language pretraining is an important step that provides good initialization for training such models. However, existing vision-language pretraining techniques employ a simple architecture and loss function which results in weak alignment between the two input modalities (vision and text). They instead rely on a large dataset with hundreds of millions of image-text pairs and also large amounts of compute infrastructure.

SUMMARY

According to aspects of the present invention, a computer-implemented method is provided for pretraining vision and language models. The method includes receiving image-text pairs, each including an image and a text describing the image. The method further includes encoding, by a neural network (NN) based visual encoder, an image into a set of feature vectors corresponding to input image patches and a Classification (CLS) token which represents a global feature of the image. The method also includes parsing, by a text tokenizer, the text into a set of feature vectors as tokens for each word in the text. The method additionally includes encoding the CLS token from the NN based visual encoder and the tokens from the text tokenizer into a set of features by a NN based text and multimodal encoder that shares weights for encoding both the CLS token and the tokens. The method further includes accumulating, by a NN based momentum encoder, the weights from multiple iterations as an exponential moving average of the weights during the pretraining until a predetermined error threshold is reduced to be under a threshold amount.

According to other aspects of the present invention, a computer program product for pretraining vision and language models is provided. The computer program product includes a non-transitory computer readable storage medium having program instructions embodied therewith. The program instructions are executable by a computer to cause the computer to perform a method. The method includes receiving image-text pairs by a hardware processor of the computer, each including an image and a text describing the image. The method further includes encoding, by a neural network (NN) based visual encoder implemented by the hardware processor, an image into a set of feature vectors corresponding to input image patches and a Classification (CLS) token which represents a global feature of the image. The method also includes parsing, by a text tokenizer implemented by the hardware processor, the text into a set of feature vectors as tokens for each word in the text. The method additionally includes encoding the CLS token from the NN based visual encoder and the tokens from the text tokenizer into a set of features by a NN based text and multimodal encoder implemented by the hardware processor that shares weights for encoding both the CLS token and the tokens. The method further includes accumulating, by a NN based momentum encoder implemented by the hardware processor, the weights from multiple iterations as an exponential moving average of the weights during the pretraining until a predetermined error threshold is reduced to be under a threshold amount.

According to still other aspects of the present invention, a computer processing system is provided. The system includes a memory device for storing program code. The system further includes a hardware processor operatively coupled to the memory device for running the program code to receive image-text pairs, each including an image and a text describing the image. The hardware processor further runs the program code to encode, by a neural network (NN) based visual encoder implemented by the hardware processor, an image into a set of feature vectors corresponding to input image patches and a (Classification) CLS token which represents a global feature of the image. The hardware processor also runs the program code to parse, by a text tokenizer implemented by the hardware processor, the text into a set of feature vectors as tokens for each word in the text. The hardware processor additionally runs the program code to encode the CLS token from the NN based visual encoder and the tokens from the text tokenizer into a set of features by a NN based text and multimodal encoder implemented by the hardware processor that shares weights for encoding both the CLS token and the tokens. The hardware processor further runs the program code to accumulate, by a NN based momentum encoder implemented by the hardware processor, the weights from multiple iterations as an exponential moving average of the weights during the pretraining until a predetermined error threshold is reduced to be under a threshold amount.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to single stream multi-level alignment for vision-language pretraining.

One or more embodiments of the present invention provide a single stream model that aligns visual and text modalities at multiple levels as follows: (i) a global instance level; (ii) a fine-grained token level; and (iii) a conceptual semantic level which contrasts with existing dual stream techniques that aligns only at the global level. This is achieved by using two novel tasks namely: symmetric cross-modality reconstruction; and concept prediction. In symmetric cross-modality reconstruction, the present invention masks the tokens of one of the modalities and uses cross-modal information to reconstruct the masked token. This can improve the fine-grained alignment between the modalities. In addition, the present invention introduces a key word prediction task for the visual encoder to predict concepts that are considered crucial by both the momentum and the multi-modal encoders. This enables the visual encoder to learn rich semantic concepts that are essential for grounding a textual token to an image region.

One or more embodiments of the present invention provide a symmetric cross-modality reconstruction task to learn fine-grained alignment between image patches and language tokens.

One or more embodiments of the present invention provide self-supervised keyword pseudo labeling for visual encoder training to preserve the concept-level semantics.

Figure 1:
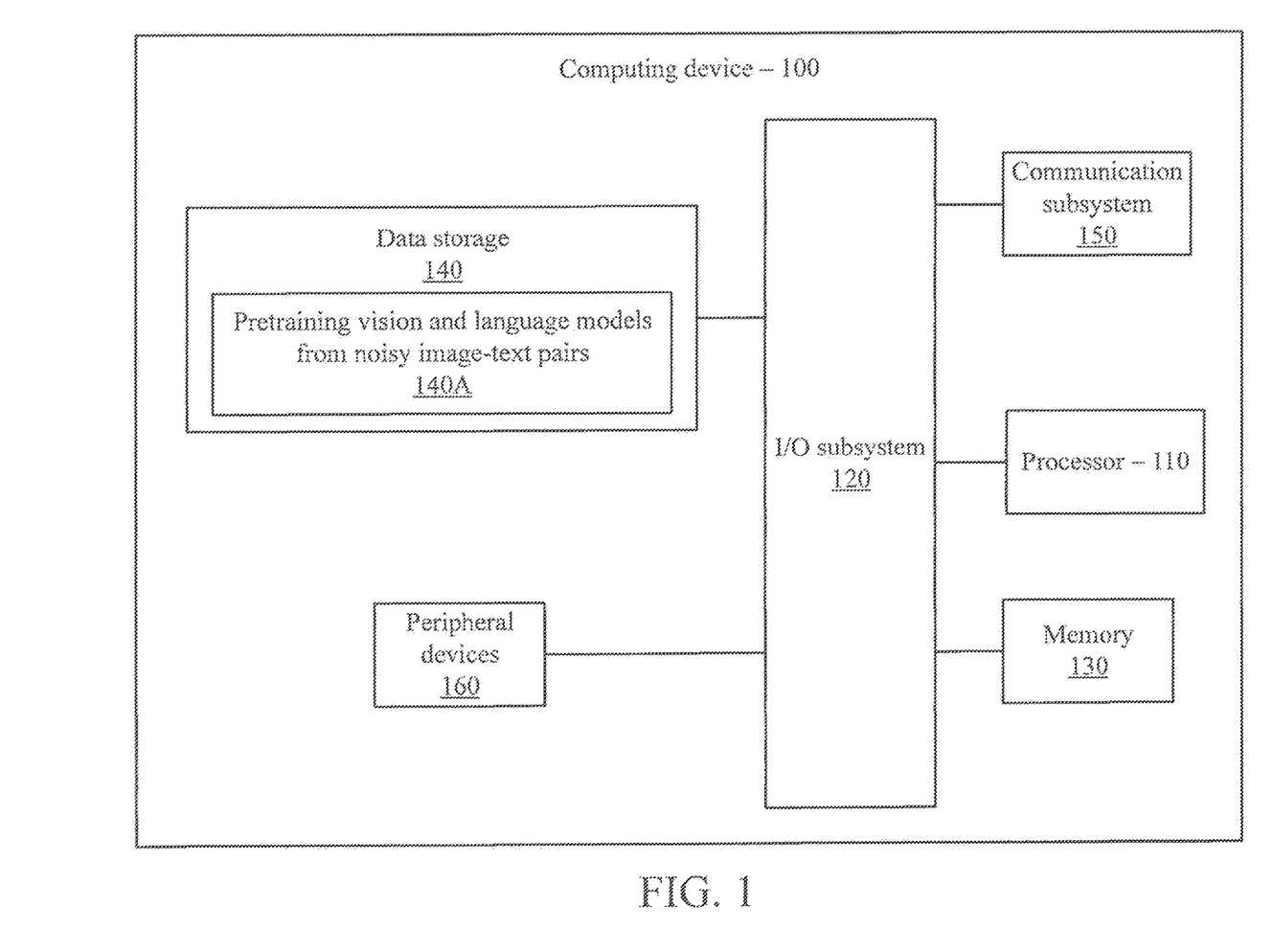
FIG. 1 is a block diagram showing an exemplary computing device 100, in accordance with an embodiment of the present invention.

FIG. 1 is a block diagram showing an exemplary computing device 100, in accordance with an embodiment of the present invention. The computing device 100 is configured to perform pretraining of vision and language models from noisy image pairs.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for pretraining of vision and language models from noisy image pairs. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention Images are dense, unstructured, and require significant processing to extract useful semantic information. In contrast, language is highly structured, and includes directly available semantic information. Because of this asymmetry, attempting to align image features with language features too early will be futile, because the image features are too low-level to be matched with the more abstract language features. Contemporary architectures thus employ a symmetric encoder design, in which both image and text are processed by equally deep encoders before late fusion through alignment of global image and text representations. This approach wastes model capacity, as high-level image semantics often correspond directly to low-level language semantics, so processing language to same depth as images is wasteful. In addition, both language and images include a semantic pyramid of concepts, with some concepts being highly localized (e.g., a small image patch/single word) while other concepts are highly abstract (e.g., multiple interrelated image patches/multi-token sequences). Cross-modal concepts can exist at different levels of the semantic pyramid for each modality (e.g., the singular token "throwing" describes a complex spatial scene, the phrase "bird walking on rocky ground" may describe a small local image region). Thus, the problems in vision-language learning are twofold: (1) Asymmetry in inherent semantic abstraction between image and text data; and (2) Semantic concepts appear at disparate levels in the abstraction hierarchy across modalities.

One or more embodiments of the present invention provide an asymmetric architecture with a multi-task loss. Concretely, the architecture of the present invention can include a deep stack of transformer encoder layers that can be interpreted as a transformer language model stacked atop a visual transformer. During the forward pass, an image is fed through the bottom of the stack, while language tokens are injected into the middle of the stack, at the bottom of the language model. This design allows processing of the image to an appropriate level of semantic abstraction before fusion with language. Our multi-task loss includes four tasks, engineered to align vision and language representations at multiple levels. An embodiment of the present invention can begin with an image-text matching task for very coarse instance-level alignment, and add a contrastive loss for global feature-level alignment. Next, an embodiment of the present invention can add a patch-level reconstruction task for fine-grained region-level alignment. Finally, an embodiment of the present invention can add a pseudo-label supervision task to the visual encoder to explicitly ensure the level of abstraction between the visual and language tokens is synchronized prior to fine-grained fusion.

Figure 2:
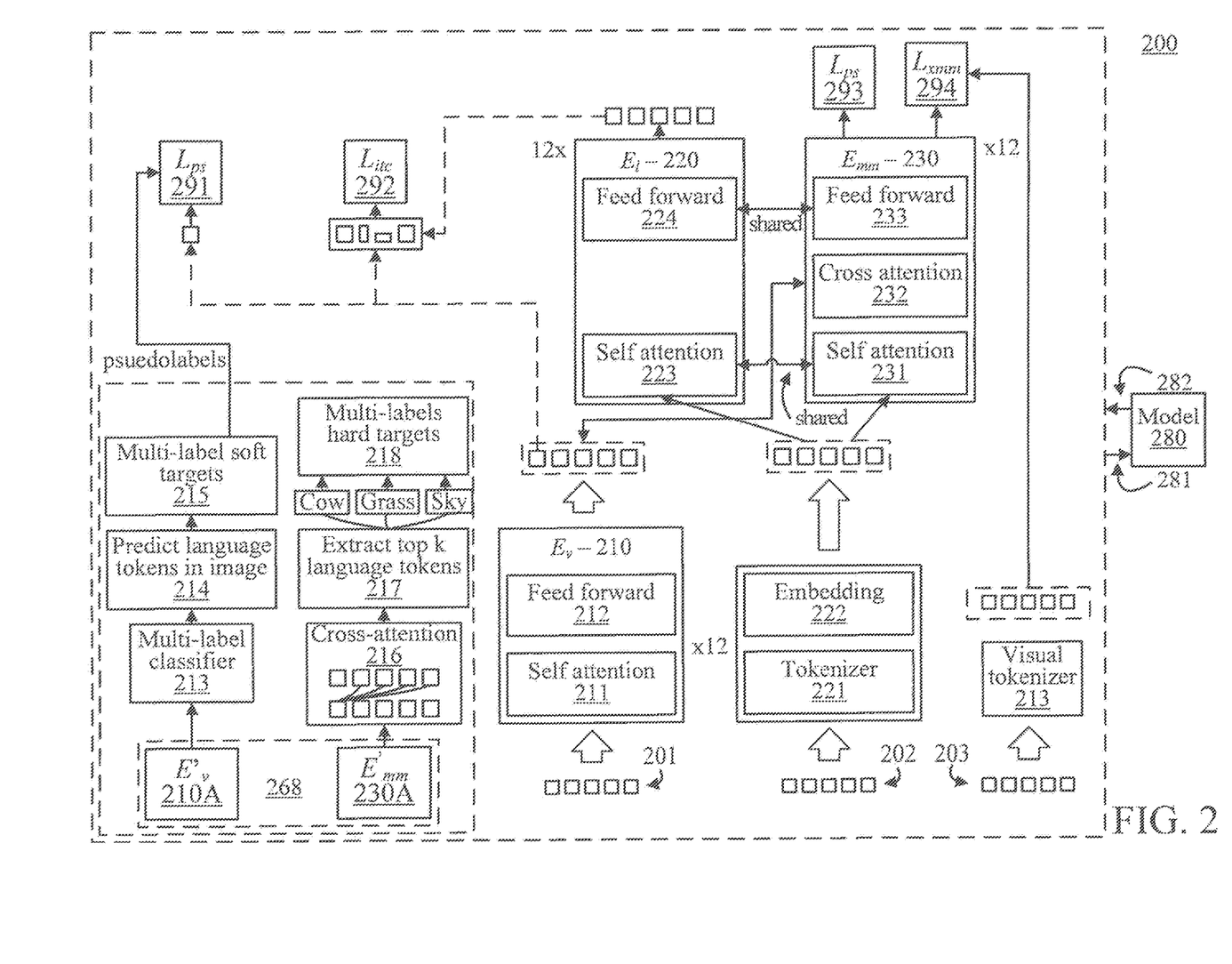
FIG. 2 is a block diagram showing an exemplary architecture 200, in accordance with an embodiment of the present invention.

FIG. 2 is a block diagram showing an exemplary architecture 200, in accordance with an embodiment of the present invention. The input sentence is first split into word pieces or subword units using a tokenizer 221 which also adds special tokens that indicates the start and end of the sentences. The processed tokens are then converted to continuous representations (of words) using an embedding module 222. These tokens are input to the text encoder El 220 and multimodal encoder Emm 230 and processed according to the functionality of each of these blocks.

A language encoder El 220 is stacked atop a vision encoder Ev 210. Cross attention is added to El 220, allowing us to reuse it as a multimodal encoder Emm 230, by consuming image embeddings from Ev 210. Four tasks align images and language at multiple levels, exploiting a momentum model for additional supervision. A D-VAE tokenizes image patches 201 for the cross-modality reconstruction task.

Our model is a 24-deep stack of transformer layers that can be decomposed into a vision encoder $E_v$ 210, a language encoder $E_l$ 220, and a multimodal encoder $E_{mm}$ 230. Specifically, the present invention stacks the language encoder El 220 atop the vision encoder $E_v$ 210. Cross-attention layers 222 are added after each self-attention layer 221 in the language encoder Er 220, allowing to use it as a multimodal encoder $E_{mm}$ 230 when an image-text pair is passed in, and as a unimodal language encoder when language tokens are passed in. To obtain a multimodal embedding, the bottom half of the transformer encoder stack ($E_v$) is first used to encode an input image I into a sequence of embeddings { $\vec{v}_{cls}, \vec{v}_1, \ldots, \vec{v}_N$} where $v_{cls}$ is the embedding of the Classification [CLS] token. The sequence of image embeddings { $\vec{v}_{cls}, \vec{v}_1, \ldots, \vec{v}_N$} is passed into the top half of the transformer encoder stack, corresponding to the language model, while concurrently injecting the associated caption, so the image embeddings { $\vec{v}_{cls}, \vec{v}_1, \ldots, \vec{v}_N$} from bottom half of the stack and the input tokens T are consumed simultaneously and fused through cross-attention 211 after each self-attention layer to yield a sequence of multimodal embeddings { $\vec{m}_{cls}, \vec{m}_1, \ldots, \vec{m}_N$}.

Cross-Modality Matching

Image-Text Contrastive Learning is a contrastive objective which pulls the embeddings of matched image-text pairs together while pushing those of unmatched image-text pairs apart. Our contrastive loss follows the InfoNCE formulation. Contrastive losses benefit from larger batch sizes, but batch sizes are bounded by GPU memory. To increase effective batch size, the present invention can use memory queues of size M for the unimodal image and text features, as well as maintaining momentum (time-averaged) versions of the text and image encoders. In an embodiment, the present invention calculates the normalized image-to-text and text-to-image similarity as follows:

$$p_m^{i2t}(I) = \frac{\exp\left(\frac{\text{sim}(I, T_m)}{\tau}\right)}{\sum_{m=1}^{M} \exp\left(\text{sim}\left(I, \frac{T_m}{\tau}\right)\right)}, p_m^{t2i}(T) = \frac{\exp\left(\frac{\text{sim}(T, I_m)}{\tau}\right)}{\sum_{m=1}^{M} \exp\left(\text{sim}\left(\frac{\text{sim}(T, I_m)}{\tau}\right)\right)} \quad (1)$$

where $\tau$ is a learnable temperature parameter, $\text{sim}(I,T)=g_v(\vec{v}_{cls})g'_l(\vec{l'}_{cls})$ and $\text{sim}(T,I)=g_l(\vec{l}_{cls})^T g'_v(\vec{v}_{cls})$ are raw similarity scores. The functions $g_v$ and $g_l$ are linear transformations that project the unimodal [CLS] embeddings of the image and text, respectively, to lower-dimensional representations. The present invention uses $g'_v(\vec{v'}_{cls})$ and $g'_l(\vec{l'}_{cls})$ to denote the momentum features, retrieved from the memory queues. The Boolean one-hot vectors $\vec{y}^{i2t}(I)$ and $\vec{y}^{t2i}(T)$ represent the ground-truth similarity, with the positive pair indicated by a 1 and a 0 for all negatives. Then, the image-text contrastive loss is defined as the cross-entropy H between $\vec{p}$ and $\vec{y}$ as follows:

$$\mathcal{L}_{itc} = \frac{1}{2}\mathbb{E}_{(I,T)\sim D}\left[H\left(y^{-i2i}(I), p^{-i2t}(I)\right) + H\left(y^{-i2i}(T), p^{-t2i}(T)\right)\right] \quad (2)$$

The one-hot labels $\vec{y}^{i2t}(I)$ and $\vec{y}^{t2i}(T)$ penalize all predictions which do not match each image to the text it came paired with, and vice versa. However, one caption can potentially describe many different images, and similarly, many captions may match an image. To avoid this noisy penalization, the present invention can soften the hard targets 218 with soft targets 215 generated by the momentum model, corresponding to knowledge distillation with the momentum model 280 as a teacher. The complete loss can then be written as follows:

$$L_{itc}^{mod} = (1 - \alpha)L_{itc} + \alpha L'_{itc} \quad (3)$$

$$L'_{itc} = \frac{1}{2}\mathbb{E}_{(I,T)\sim D}\left[H\left(p_m^{it2}(I)\right) + H\left(p_m^{t2i}(T), p^{t2i}(T)\right)\right] \quad (4)$$

where $$p_m^{i2t}(I)$$

and $$p_m^{t2i}(T)$$

is Equation 1 using only the momentum encoders.

Image-Text Matching is a binary classification task to predict if an image-text pair is matched. In an embodiment, the present invention can define the ITM loss to be as follows:

$$L_{itm}=\mathbb{E}_{(I,T)\sim D}H(y^{itm},p^{itm}(I,T)) \quad (5)$$

where $y^{itm}$ is a one-hot vector indicating whether the pair is matched or not, and $p^{itm}$ is a two-class probability vector predicted by a single fully connected layer on top of the multimodal [CLS] token. In an embodiment, the present invention can mine in-batch hard negatives for each image and text in a pair.

Finer-Grained Cross-Modality Alignment

A contrastive loss such as $\mathcal{L}_{itc}$ 292 aligns the global image and text representations. However, solely aligning the global representations while simultaneously fusing the image and text at the last possible opportunity makes it difficult to learn fine-grained correspondences, such as those between subregions of an image and subsequences of a caption. In an embodiment, the present invention can design a reconstruction task to teach a model fine-grained alignment between images and patches. The present invention can mask the image, and force the model to reconstruct the masked image region from the remaining portion of the image using the caption as context. The present invention can then reverse the reconstruction task, forcing the model to reconstruct masked language tokens from the remaining portion of the caption using the image as context. Each modality is masked in turn, and the model is trained to reconstruct the masked modality using the unmasked modality as context. Concretely, (I, T) be an image text pair. In an embodiment, the present invention can generate a random mask $M_I$ for the image I, and a random mask $M_T$ for the text T. The present invention then creates a masked image text pair ($\hat{I}=M_I\odot I$, $\hat{T}=M_T\odot T$). Then, the loss to be minimized is as follows:

$$L_{xmm}=\mathbb{E}_{(I,T)\sim D}H(y^{MLM},p^{MLM}(I,\hat{T}))+\mathbb{E}_{(I,T)\sim D}H(y^{MIM}, p^{MIM}(\hat{I},T)) \quad (6)$$

$$E_{mm}(E_v(I\odot M_I),T)I-I\odot M + \not\models \odot \hat{v}_{[mask]} \quad (7)$$

The cross-modality masked language modeling loss $\mathcal{L}_{xmm}$ 294 is a sum of two cross-entropy losses, where $y^{MLM}$ and $y^{MIM}$ indicate the ground-truth value of the masked language token and masked image token respectively, and $p^{MLM}(I, \vec{T}), p^{MIM}(I, \hat{T})$ represents the model's probability estimates of the masked language and image tokens respectively. Because images are continuous, the present invention discretizes the images into a sequence of tokens and masks them. In an embodiment, the present invention divides each image into patches 201 and tokenizes each patch with a discrete VAE that maps each patch 201 to one of 8192 visual tokens from a learned codebook.

In many cases, the ground-truth visual or language token can be plausibly replaced with an alternative. However, the ground truth target vectors are one-hot encoded and penalize any predictions that do not exactly match for the ground truth, even if they are plausible. Furthermore, the image masking and language masking are random, so it is possible for non-content tokens (e.g. the, it) or tokens that cannot be predicted well based on context to be masked. To allow the model to learn even when the ground-truth target for the masked token cannot be reasonably predicted from context, the present invention again uses the momentum distillation strategy. Specifically, the present invention decomposes $L_{xmm}$ 294 into the following:

$$\mathcal{L}_{xmm}^{mod} = \quad (8)$$

$$(1 - \alpha)L_{MIM} + \alpha L'_{MLM} \text{ where } \mathcal{L}'_{MLM} = H\left(p_m^{MIM}, p^{MIM}(I, \hat{T})\right),$$

-continued $$L'_{MLM} = H(p_m^{MLM}, p^{MLM}(I, \hat{T})) \text{ and } p_m^{MIM}, p_m^{MLM}$$

are the softmax-normalized outputs of the MIM and MLM momentum prediction heads over the visual and language token distributions, respectively.

Visual Embedding Harness by Self-Supervision

Visual Embedding Harness by Self-Supervision is a high-level alignment task in which the visual representation is aligned to represent concepts expressible by the language encoder. The present invention uses the self-attention map (shown in 216) and the [CLS] token of the momentum multimodal encoder (shown in 230A) to determine which language tokens within the text are most salient to the image-text pair. In embodiment, the present invention chooses k of the most salient tokens (shown in 217) as pseudo-labels for the image, and generates a "hard" 2-D binary target (shown in 218) vector $y^{PSL} \in R^{2 \times V}$, where V is the number of tokens known to the language model, and a 1 in the [0][i]-th position indicates the i-th token is a target pseudo-label and a 1 in the [1][j]-th position indicates the j-th token is not a target. The present invention seeks to minimize the following:

$$\mathcal{L}_{PSL} = -\frac{1}{V}\sum_{i=1}^{V} Y_i^{PSL} \cdot \log(\sigma(p_i^{PSL})) + (1 - y_i^{PSL}) \cdot \log(1 - \sigma(p_i^{PSL})) \quad (9)$$

where $p^{PSL}$ is the output of a single fully-connected layer placed atop the uni-modal image [CLS] token, $\sigma(\cdot)$ is a sigmoid function used the clamp the output of the fully-connected layer between 0 and 1, and V is the number of tokens in the vocabulary of the tokenizer. This corresponds to multi-label loss where the model is trained to predict which language concepts (corresponding to tokens) are present in the image, using only the image context. However, the binary pseudolabels $y^{PSL}$ may fail to capture relevant concepts in the image, because the caption typically only describes a small number of aspects of an image. To provide a stronger self-supervisory signal, in an embodiment, the present invention can use the momentum model 280 as a teacher and minimize the K-L divergence between the predicted pseudolabels and the momentum pseudolabels. The momentum psuedolabels $p'^{PSL}$ (shown in 215) are obtained by projecting the CLS token of the of the unimodal visual momentum encoder (shown in 210A) to a V dimensional space using a fully-connected layer (shown in 221) to obtain the most salient text tokens (shown in 222) or concepts. These are used as momentum psuedolabels (shown in 215) for the unimodal visual encoder. This can be expressed as a distillation loss (shown in 291) where p'PSL is the vector of momentum pseudolabel predictions as follows:

$$\mathcal{L}_{PSL}^{mod} = (1 - \alpha)\mathcal{L}_{PSL} - \frac{\alpha}{V}\sum_{i=1}^{V} p_i'^{PSL} \cdot \log(\sigma(p_i^{PSL})) + (1 - p_i'^{PSL}) \cdot \log(1 - \sigma(p_i^{PSL})) \quad (10)$$

The full pre-training objective can be expressed as follows:

$$\mathcal{L} = \mathcal{L}_{itc}^{mod} + \mathcal{L}_{xmm}^{mod} + \mathcal{L}_{itm} + \mathcal{L}_{PSL}^{mod} \quad (11)$$

Figure 3:
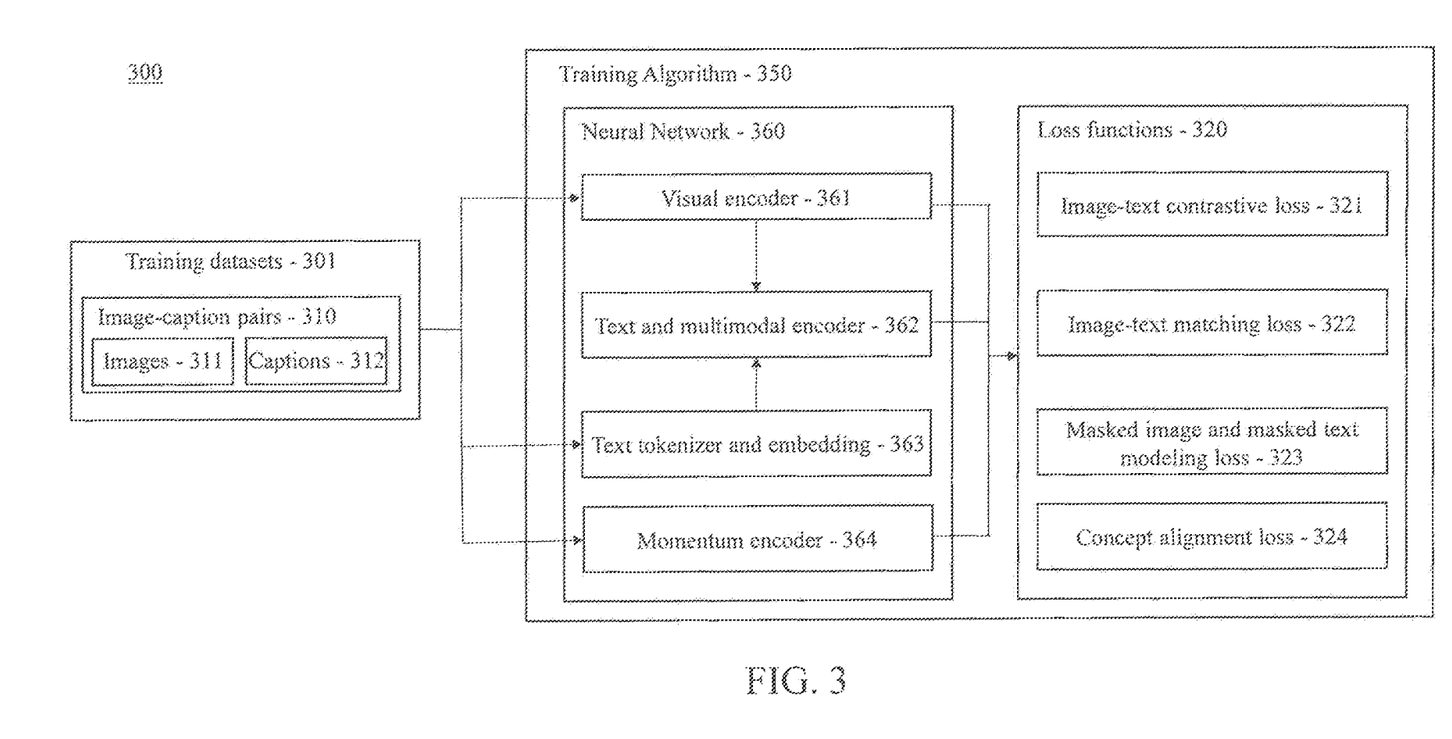
FIG. 3 is a diagram illustrating an exemplary flow 300, in accordance with an embodiment of the present invention.

FIG. 3 is a diagram illustrating an exemplary flow 300, in accordance with an embodiment of the present invention.

The training dataset 301 is used to train the neural network 360.

Each sample in the dataset includes an image-caption pair 310 that, in turn, includes an image 311 and a corresponding caption/text 312 describing the image 311.

The training algorithm 350 involves a neural network 360 to be trained and loss functions 320 to be used to train the neural network.

All learnable parameters of the neural network 360 that the training algorithm 350 learns during training are summarized.

The visual encoder 361 is a neural network that takes an image as the input and outputs a set of feature vectors (corresponding to input image patches) and a CLS token that represents the global feature of the image.

The text tokenizer and embedding element 363 takes in the input caption/text, parses it, and outputs a set of tokens (feature vectors) for each word.

The text and multimodal encoder 221 is a neural network that processes the input tokens from visual encoder 361 and text tokenizer 363 and outputs a set of feature vectors. Note that this is a single network that acts as both text encoder (text only) and multimodal encoder (visual and text), it uses the same subset of weights for both encoders (parameter sharing).

The momentum encoder 364 is a neural network that is used to accumulate the weights/parameters of the network from different iterations, i.e., it is an exponential moving average of weights/parameters of the visual encoder 361 and the text and multimodal encoder 362.

The loss functions 320 are used during training to update the parameters of the neural network 360.

Image text contrastive loss 321 is used to align global representations of the image and the text. The (global) image 361 and the text 362 representations from the same image-text pairs are encouraged to be closer and from different pairs are encouraged to be farther in the feature space.

Image text matching loss 322 is a binary classification task that encourages a high score for matching image-text pairs from the output of multimodal encoder 362 and a low score for non-matching image-text pair.

Masked image and masked text modeling loss 323 relates to, during training, some parts of the input (image or text) are masked 310 and provided as input to the visual encoder 361 and text encoder 362. These are then reconstructed at the output and the discrepancy between the reconstructed and original data (masked text/image) is minimized. This is helpful for fine-grained alignment between visual and text modalities. The concept alignment loss 324 encourages the visual encoder 361 to predict/learn the higher-level semantic concepts that are present in the image (may/may not be available in the captions). The pseudo-labels for this task are generated from the momentum 364 and text encoder 362.

Figure 4:
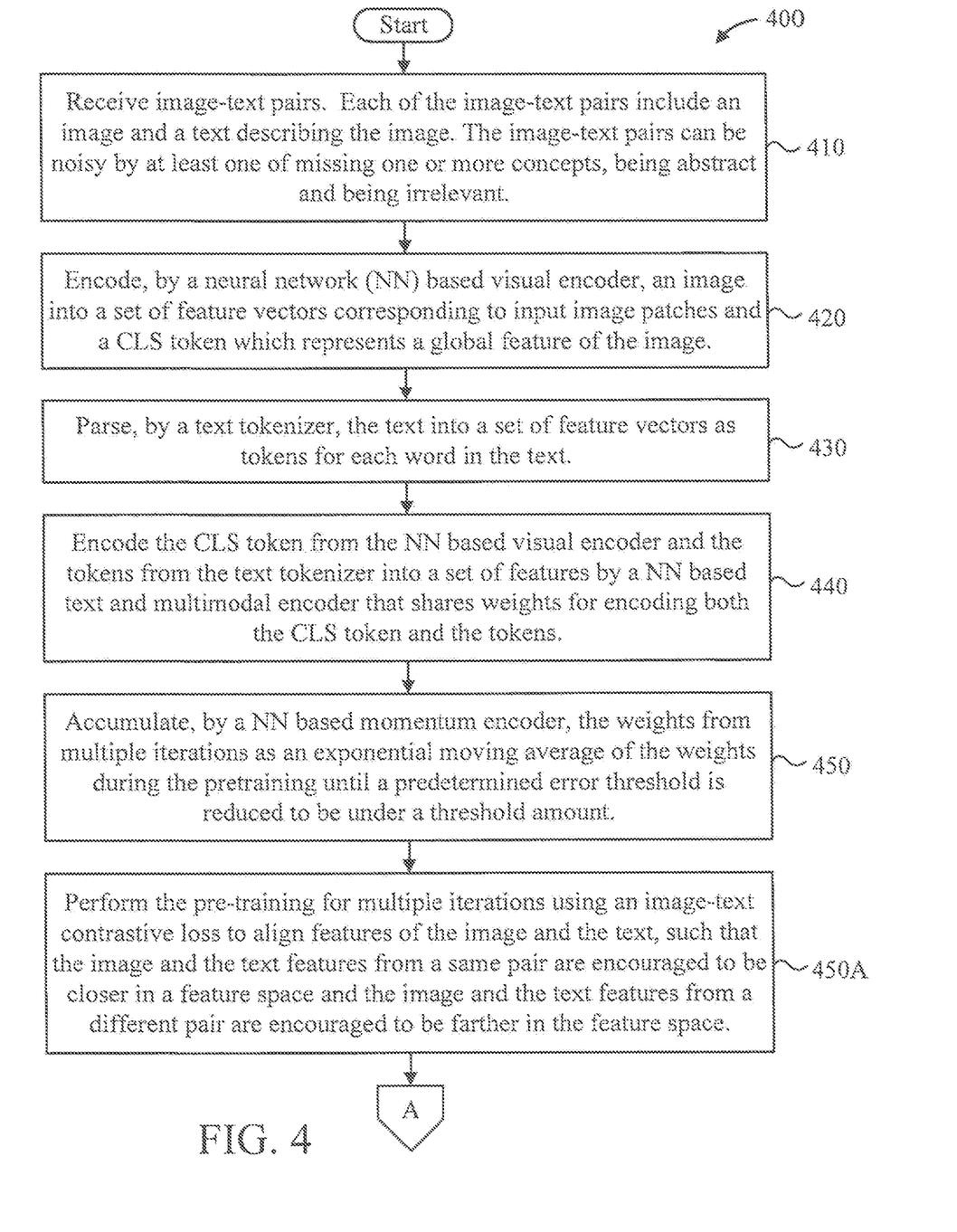
FIGS. 4-5 are flow diagrams showing an exemplary method for vision and language model pretraining, in accordance with an embodiment of the present invention.
Figure 5:
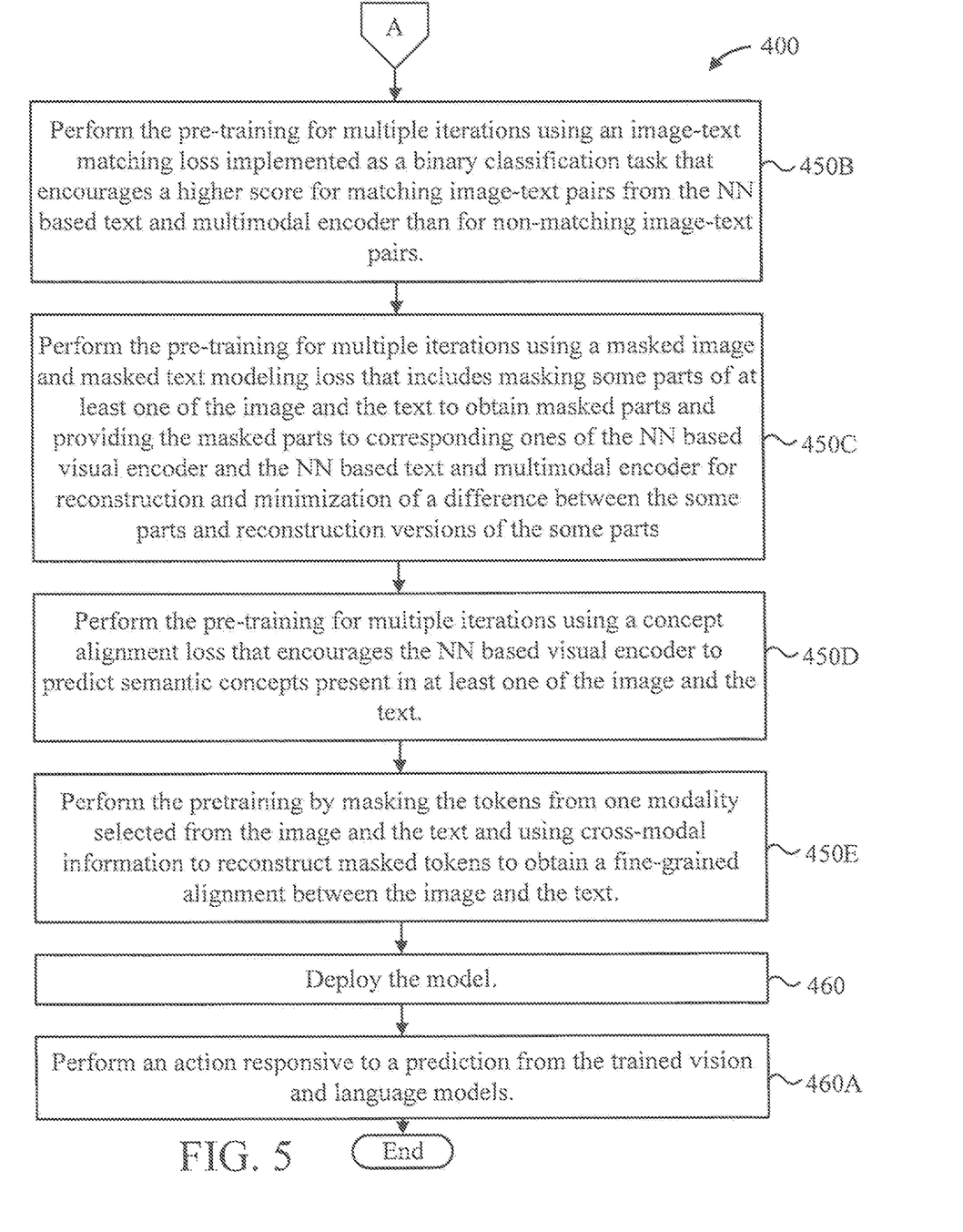

FIGS. 4-5 are flow diagrams showing an exemplary method for vision and language model pretraining, in accordance with an embodiment of the present invention.

At block 410, receive image-text pairs. Each of the image-text pairs include an image and a text describing the image. In an embodiment, the image-text pairs are noisy by at least one of missing one or more concepts, being abstract and being irrelevant.

At block 420, encode, by a neural network (NN) based visual encoder, an image into a set of feature vectors corresponding to input image patches and a CLS token which represents a global feature of the image.

At block 430, parse, by a text tokenizer, the text into a set of feature vectors as tokens for each word in the text.

At block 440, encode the CLS token from the NN based visual encoder and the tokens from the text tokenizer into a set of features by a NN based text and multimodal encoder that shares weights for encoding both the CLS token and the tokens.

At block 450, accumulate, by a NN based momentum encoder, the weights from multiple iterations as an exponential moving average of the weights during the pretraining until a predetermined error threshold is reduced to be under a threshold amount.

In an embodiment, block 450 can include one or more of blocks 450A through 450E.

At block 450A, perform the pre-training for multiple iterations using an image-text contrastive loss to align features of the image and the text, such that the image and the text features from a same pair are encouraged to be closer in a feature space and the image and the text features from a different pair are encouraged to be farther in the feature space.

At block 450B, perform the pre-training for multiple iterations using an image-text matching loss implemented as a binary classification task that encourages a higher score for matching image-text pairs from the NN based text and multimodal encoder than for non-matching image-text pairs.

At block 450C, perform the pre-training for multiple iterations using a masked image and masked text modeling loss that includes masking some parts of at least one of the image and the text to obtain masked parts and providing the masked parts to corresponding ones of the NN based visual encoder and the NN based text and multimodal encoder for reconstruction and minimization of a difference between the some parts and reconstruction versions of the some parts.

At block 450D, perform the pre-training for multiple iterations using a concept alignment loss that encourages the NN based visual encoder to predict semantic concepts present in at least one of the image and the text.

At block 450E, perform the pretraining by masking the tokens from one modality selected from the image and the text and using cross-modal information to reconstruct masked tokens to obtain a fine-grained alignment between the image and the text.

At block 460, deploy the model.

In an embodiment, block 460 can include block 460A.

At block 460A, perform an action responsive to a prediction from the trained vision and language models. For example, the prediction can indicate an impending collision by a motor vehicle. In such a case, accident avoidance measures involving controlling one or more systems of a motor vehicle such as steering, braking, accelerating, stability, lighting, and so forth.

Figure 6:
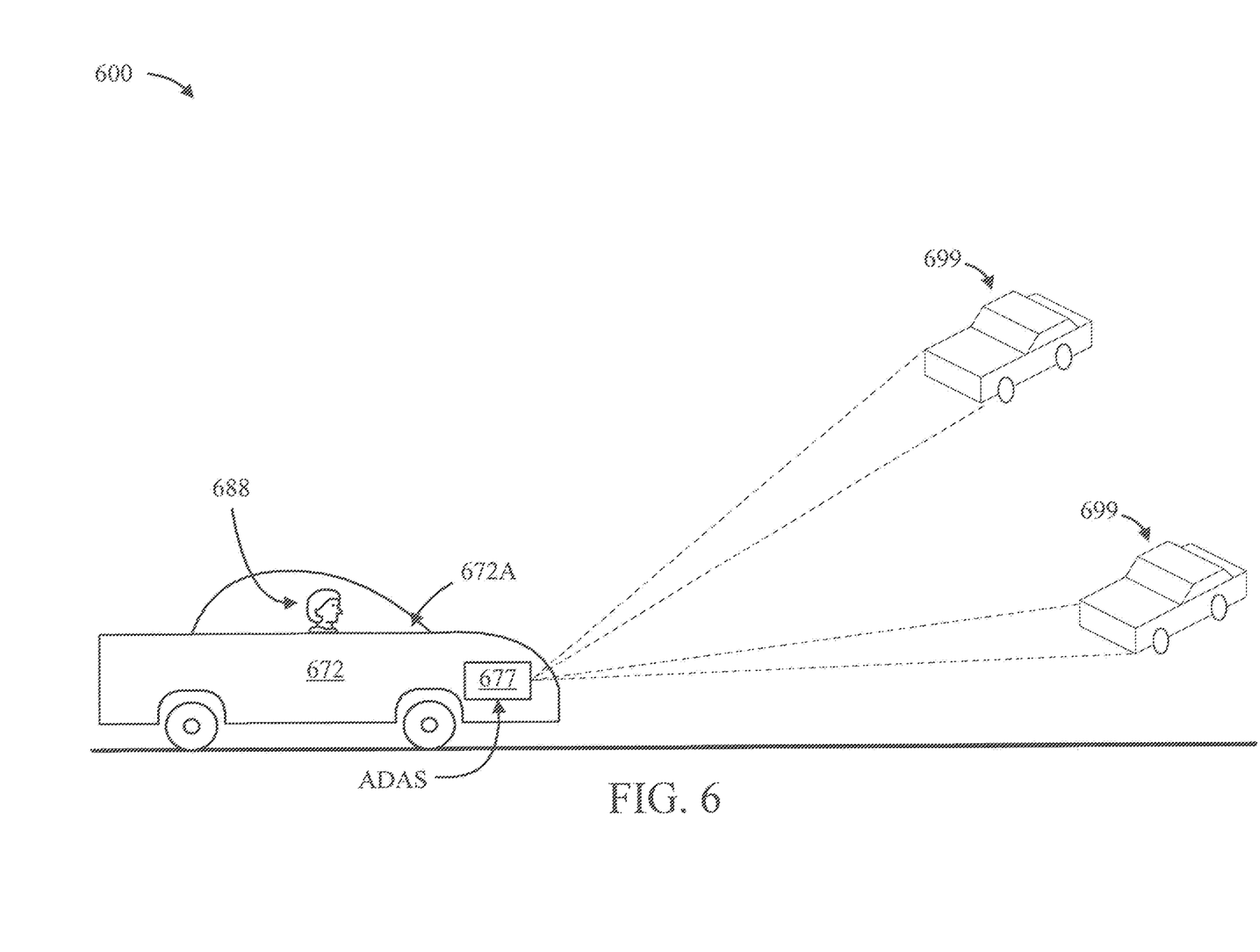
FIG. 6 is a block diagram showing an exemplary environment to which the present invention can be applied, in accordance with an embodiment of the present invention.

FIG. 6 is a block diagram showing an exemplary environment 600 to which the present invention can be applied, in accordance with an embodiment of the present invention.

In the environment 600, a user 688 is located in a scene with multiple objects 699, each having their own locations and trajectories. The user 688 is operating a vehicle 672 (e.g., a car, a truck, a motorcycle, etc.) having an ADAS 677.

The ADAS 677 receives one or more predictions from one or more of a vision model(s) and a language model(s).

Responsive to the one or more predictions, a vehicle controlling decision is made. To that end, the ADAS 677 can control, as an action corresponding to a decision, for example, but not limited to, steering, braking, and accelerating systems.

Thus, in an ADAS situation, steering, accelerating/braking, friction (or lack of friction), yaw rate, lighting (hazards, high beam flashing, etc.), tire pressure, turn signaling, and more can all be efficiently exploited in an optimized decision in accordance with the present invention.

The system of the present invention (e.g., system 677) may interface with the user through one or more systems of the vehicle 672 that the user is operating. For example, the system of the present invention can provide the user information through a system 672A (e.g., a display system, a speaker system, and/or some other system) of the vehicle 672. Moreover, the system of the present invention (e.g., system 677) may interface with the vehicle 672 itself (e.g., through one or more systems of the vehicle 672 including, but not limited to, a steering system, a braking system, an acceleration system, a steering system, a lighting (turn signals, headlamps) system, etc.) in order to control the vehicle and cause the vehicle 672 to perform one or more actions. In this way, the user or the vehicle 672 itself can navigate around these objects 699 to avoid potential collisions there between. The providing of information and/or the controlling of the vehicle can be considered actions that are determined in accordance with embodiments of the present invention.

While described with respect to an ADAS, the present invention can be applied to a myriad of applications involving, e.g., a trajectory. For example, navigation involving automated agents, robots, assistive technologies for blind people, and/or so forth can be exploited by embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for pretraining vision and language models, comprising:
receiving image-text pairs, each including an image and a text describing the image;
encoding, by a neural network (NN) based visual encoder, an image into a set of feature vectors corresponding to input image patches and a Classification (CLS) token which represents a global feature of the image;
parsing, by a text tokenizer, the text into a set of feature vectors as tokens for each word in the text;
encoding the CLS token from the NN based visual encoder and the tokens from the text tokenizer into a set of features by a NN based text and multimodal encoder that shares weights for encoding both the CLS token and the tokens;
accumulating, by a NN based momentum encoder, the weights from multiple iterations as an exponential moving average of the weights during the pretraining until a predetermined error threshold is reduced to be under a threshold amount including minimizing a divergence between predicted pseudolabels and momentum pseudolabels that are concepts obtained by projecting the CLS token to a V-dimensional space with a fully-connected layer of the NN based momentum encoder to obtain a pre-trained NN-based visual and language model; and
controlling an autonomous vehicle to avoid collisions based on a trajectory generated with the pre-trained NN-based visual and language model that utilizes input images from a traffic scene.

2. The computer-implemented method of claim 1, wherein accumulating the weights further comprises performing for multiple iterations using an image-text contrastive loss to align image and text features, such that the image and the text features from a same pair are encouraged to be closer in a feature space and the image and the text features from a different pair are encouraged to be farther in the feature space.

3. The computer-implemented method of claim 1, wherein accumulating the weights further comprises performing for multiple iterations using an image-text matching loss implemented as a binary classification task that encourages a higher score for matching image-text pairs from the NN based text and multimodal encoder than for non-matching image-text pairs.

4. The computer-implemented method of claim 1, wherein wherein accumulating the weights further comprises performing for multiple iterations using a masked image and masked text modeling loss that comprises masking some parts of at least one of the image and the text to obtain masked parts and providing the masked parts to corresponding ones of the NN based visual encoder and the NN based text and multimodal encoder for reconstruction and minimization of a difference between the some parts and reconstruction versions of the some parts.

5. The computer-implemented method of claim 1, wherein accumulating the weights further comprises performing for multiple iterations using a concept alignment loss that encourages the NN based visual encoder to predict semantic concepts present in at least one of the image and the text by minimizing the divergence between the predicted pseudolabels and the momentum pseudolabels.

6. The computer-implemented method of claim 1, wherein the image-text pairs are noisy by at least one of missing one or more concepts, being abstract and being irrelevant.

7. The computer-implemented method of claim 1, wherein accumulating the weights further comprises masking the tokens from one modality selected from the image and the text and using cross-modal information to reconstruct masked tokens using an unmasked modality as context to obtain a fine-grained alignment between the image and the text.

8. The computer-implemented method of claim 1, further comprising:
computing a global alignment by capturing modality-invariant information; and
computing a loss value based on the modality-invariant information.

9. A computer program product for pretraining vision and language models, the computer program product comprising a non-transitory computer readable storage medium having program instructions embodied therewith, the program instructions executable by a computer to cause the computer to perform a method comprising:
receiving image-text pairs by a hardware processor of the computer, each including an image and a text describing the image;
encoding, by a neural network (NN) based visual encoder implemented by the hardware processor, an image into a set of feature vectors corresponding to input image patches and a Classification (CLS) token which represents a global feature of the image;
parsing, by a text tokenizer implemented by the hardware processor, the text into a set of feature vectors as tokens for each word in the text;
encoding the CLS token from the NN based visual encoder and the tokens from the text tokenizer into a set of features by a NN based text and multimodal encoder implemented by the hardware processor that shares weights for encoding both the CLS token and the tokens;
accumulating, by a NN based momentum encoder implemented by the hardware processor, the weights from multiple iterations as an exponential moving average of the weights during the pretraining until a predetermined error threshold is reduced to be under a threshold amount including minimizing a divergence between predicted pseudolabels and momentum pseudolabels that are concepts obtained by projecting the CLS token to a V-dimensional space with a fully-connected layer of the NN based momentum encoder to obtain a pre-trained NN-based visual and language model; and
controlling an autonomous vehicle to avoid collisions based on a trajectory generated with the pre-trained NN-based visual and language model that utilizes input images from a traffic scene.

10. The computer program product of claim 9, wherein accumulating the weights further comprises performing for multiple iterations using an image-text contrastive loss to align features of the image and the text, such that the image and the text features from a same pair are encouraged to be closer in a feature space and the image and the text features from a different pair are encouraged to be farther in the feature space.

11. The computer program product of claim 9, wherein accumulating the weights further comprises performing for multiple iterations using an image-text matching loss implemented as a binary classification task that encourages a higher score for matching image-text pairs from the NN based text and multimodal encoder than for non-matching image-text pairs.

12. The computer program product of claim 9, wherein accumulating the weights further comprises performing for multiple iterations using a masked image and masked text modeling loss that comprises masking some parts of at least one of the image and the text to obtain masked parts and providing the masked parts to corresponding ones of the NN based visual encoder and the NN based text and multimodal encoder for reconstruction and minimization of a difference between the some parts and reconstruction versions of the some parts.

13. The computer program product of claim 9, wherein accumulating the weights further comprises performing for multiple iterations using a concept alignment loss that encourages the NN based visual encoder to predict semantic concepts present in at least one of the image and the text.

14. The computer program product of claim 9, wherein the image-text pairs are noisy by at least one of missing one or more concepts, being abstract and being irrelevant.

15. The computer program product of claim 9, wherein accumulating the weights further comprises performing further comprises masking the tokens from one modality selected from the image and the text and using cross-modal information to reconstruct masked tokens to obtain a fine-grained alignment between the image and the text.

16. The computer program product of claim 9, further comprising:
   computing a global alignment by capturing modality-invariant information; and
   computing a loss value based on the modality-invariant information.

17. A computer processing system, comprising:
   a memory device for storing program code; and
   a hardware processor operatively coupled to the memory device for running the program code for pretraining vision and language models including:
      receive image-text pairs, each including an image and a text describing the image;
      encode, by a neural network (NN) based visual encoder implemented by the hardware processor, an image into a set of feature vectors corresponding to input image patches and a Classification (CLS) token which represents a global feature of the image;
      parse, by a text tokenizer implemented by the hardware processor, the text into a set of feature vectors as tokens for each word in the text;
      encode the CLS token from the NN based visual encoder and the tokens from the text tokenizer into a set of features by a NN based text and multimodal encoder implemented by the hardware processor that shares weights for encoding both the CLS token and the tokens;
      accumulate, by a NN based momentum encoder implemented by the hardware processor, the weights from multiple iterations as an exponential moving average of the weights during the pretraining until a predetermined error threshold is reduced to be under a threshold amount including minimizing a divergence between predicted pseudolabels and momentum pseudolabels that are concepts obtained by projecting the CLS token to a V-dimensional space with a fully-connected layer of the NN based momentum encoder to obtain a pre-trained NN-based visual and language model; and
      control an autonomous vehicle to avoid collisions based on a trajectory generated with the pre-trained NN-based visual and language model that utilizes input images from a traffic scene.

18. The computer processing system of claim 17, wherein accumulating the weights further comprises performing for multiple iterations using an image-text contrastive loss to align features of the image and the text, such that the image and the text features from a same pair are encouraged to be closer in a feature space and the image and the text features from a different pair are encouraged to be farther in the feature space.

19. The computer processing system of claim 17, wherein accumulating the weights further comprises performing for multiple iterations using an image-text matching loss implemented as a binary classification task that encourages a higher score for matching image-text pairs from the NN based text and multimodal encoder than for non-matching image-text pairs.

20. The computer processing system of claim 17, wherein accumulating the weights further comprises performing for multiple iterations using a masked image and masked text modeling loss that comprises masking some parts of at least one of the image and the text to obtain masked parts and providing the masked parts to corresponding ones of the NN based visual encoder and the NN based text and multimodal encoder for reconstruction and minimization of a difference between the some parts and reconstruction versions of the some parts.

* * * * *